United States Patent
Al-Marzouqi et al.

(10) Patent No.: US 12,371,376 B2
(45) Date of Patent: Jul. 29, 2025

(54) COMPOSITE PLASTERING MATERIAL

(71) Applicant: UNITED ARAB EMIRATES UNIVERSITY, Al Ain (AE)

(72) Inventors: Ali H. Al-Marzouqi, Al Ain (AE); Noura Juaan Mubarak Al Mazrouei, Al Ain (AE); Waleed Khalil Ahmed, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 17/940,832

(22) Filed: Sep. 8, 2022

(65) Prior Publication Data
US 2024/0083815 A1 Mar. 14, 2024

(51) Int. Cl.
*C04B 14/06* (2006.01)
*C04B 20/00* (2006.01)
(Continued)

(52) U.S. Cl.
CPC ............ *C04B 24/383* (2013.01); *C04B 14/06* (2013.01); *C04B 20/0076* (2013.01);
(Continued)

(58) Field of Classification Search
CPC ... C04B 14/06; C04B 20/0076; C04B 24/383; C08K 3/34; C08K 5/00
See application file for complete search history.

(56) References Cited

U.S. PATENT DOCUMENTS 6,110,271 A * 8/2000 Skaggs .................... C04B 24/38
106/729
2008/0050176 A1* 2/2008 Amarena ................ C04B 26/04
404/32
(Continued)

FOREIGN PATENT DOCUMENTS

CN 1209812 A * 3/1999 ........... C04B 24/166
CN 106495658 A * 3/2017
(Continued)

OTHER PUBLICATIONS

Hazarika et al. (Use of a plant based polymeric material as a low cost chemical admixture in cement mortar and concrete preparations, Journal of Building Engineering 15, 2018, 194-202).*
(Continued)

*Primary Examiner* — Jun Li
(74) *Attorney, Agent, or Firm* — Nath, Goldberg & Meyer; Joshua B. Goldberg

(57) ABSTRACT

A composite plastering material and a method of making the same are provided. The composite plastering material includes a mixture of sand-silica and *Abelmoschus esculentus* powder. The composite plastering material has increased compressive strength depending upon the concentration of *Abelmoschus esculentus* powder used. The method of making the composite plastering material includes sieving the sand-silica to produce sand-silica of a uniform particle size, mixing powdered *Abelmoschus esculentus* powder with the sand-silica to produce a first mixture, and mixing water with the first mixture to produce the composite plastering mate-
(Continued)

rial. Optionally, the method may also include milling the sand-silica prior to sieving and combining the sand-silica with the *Abelmoschus esculentus* powder. The composite plastering material may then be plaster cast, such as by pressing the composite plastering material in a hot press and drying the resulting composite material in an oven.

17 Claims, 5 Drawing Sheets

(51) Int. Cl.
  *C04B 24/00*  (2006.01)
  *C04B 24/38*  (2006.01)
  *C08K 3/34*  (2006.01)
  *C08K 5/00*  (2006.01)
  *C04B 111/00*  (2006.01)

(52) U.S. Cl.
  CPC ............... *C04B 24/00* (2013.01); *C08K 3/34* (2013.01); *C08K 5/00* (2013.01); *C04B 2111/00017* (2013.01)

(56) References Cited

U.S. PATENT DOCUMENTS

| | | | | |
|---|---|---|---|---|
| 2012/0328788 A1* | 12/2012 | Willimann | ........... | C04B 40/0039 524/297 |
| 2014/0171553 A1* | 6/2014 | Wunderlich | ............ | C04B 20/00 524/5 |

FOREIGN PATENT DOCUMENTS

| | | | | |
|---|---|---|---|---|
| CN | 107501979 A | | 12/2017 | |
| CN | 107602042 A | * | 1/2018 | |
| CN | 108148341 A | | 6/2018 | |
| CN | 109021646 A | | 12/2018 | |
| CN | 115231874 A | * | 10/2022 | |
| GB | 2471096 A | | 12/2010 | |
| TW | 200938515 A | * | 9/2009 | ............. C04B 14/04 |
| WO | WO-2010112197 A1 | * | 10/2010 | ............. C04B 18/24 |

OTHER PUBLICATIONS

Xu et al., Molecular characteristics and rheological properties of water-extractable polysaccharides derived from okra (*Abelmoschus esculentus* L.), International Journal of Food Properties 2017, vol. 20, No. 81, S899-S909.*

Srinivasababu, N., "An Overview of Okra Fibre Reinforced Polymer Composites," IOP Conference Series: Materials Science and Engineering, 83, 2015.

Reddy, S. P., et al., "Tensile and Flexural Strength of Okra Fiber Reinforced Polymer Composites," International Journal of Engineering and Management Research, vol. 6, Issue-1, Jan.-Feb. 2016, p. No. 491-495.

Gironi, F., et al., "Bioplastics and Petroleum-based Plastics: Strengths and Weaknesses," Energy Sources, Part A: Recovery, Utilization, and Environmental Effects, 33: pp. 1949-1959, Aug. 2011.

Balart, R., et al., "Biopolymers from Natural Resources," polymers 13: 2532 Jul. 2021.

Chatterjee, S., et al., "Novel Approach of Extraction and Characterization of Okra Gum as a Binder for Tablet Formulation," Asian Journal of Pharmaceutical and clinical Research 12(1): pp. 189-192 (2019).

Hussain, A., et al., "An Evaluation of the Binding Stength of Okra Gum and the Drug Release Characteristics of Tablets Prepared from it," Pharmaceutics 9(2): 20 (2017).

* cited by examiner

COMPOSITE PLASTERING MATERIAL

BACKGROUND

1. Field

The disclosure of the present patent application relates to plastering materials, and particularly to a composite plastering material and method of making the composite plastering material.

2. Description of the Related Art

Commonly used polymeric materials and additives include petroleum-derived chemically synthesized polymers that are largely used for construction applications. Recently, polymers have become one of the most widespread hazards in the aquatic environment throughout the world. Plastic waste in the form of synthetic polymers has been detected throughout the world's ecosystem. Some of these toxic materials can be very hazardous, nondegradable, and hydrophobic. Also, there are a significant amount of polymers in the atmosphere that might be discharged through spillage or overflow from converters and other systems. These materials can be found in packing materials, electronic equipment, insecticidal chemicals, fabric, and manufacturing parts. The disposal of dangerous materials in the environment, whether in a marine area like oceans, seas, or bays, or in wildlife is leading to the death of many animals.

Biopolymers are a new class of materials with the potential to be used as substitutes for chemically synthesized polymers. Recently, biopolymers have received considerable interest due to a growing focus on sustainable evolution. Biopolymers may be made from natural sources and can contain a wide range of substances including glycan (celluloses, gellan gum, gelatin, gums, and bromelain), animal-based protein (whey, collagen, and gelatin), and lipids (bee wax, ceara wax, and triacylglycerol). Many biopolymers have a number of useful eco-friendly properties, including being non-reactive, lightness, stable, and safe, as well as demonstrating potentially useful form and size variability. Biopolymers have been successfully applied in the pharmaceutical and medical industries, as well as in the production of containers and wrapping materials, one-use flatware, and sanitary, electric and electronic, automobile, and agricultural greenhouses materials.

Natural biopolymers are also used as disintegrants, binders, film formers, cellulose derivatives, modulating agents for drug release, thickeners, emulsifying agents, and gelling agents. Plant-based biopolymers have an essential part in many fields such as pharmacology, nutritional supplements, cosmetics, and dietary supplements. They also play an important part in modern medicines to provide medical supplies. Moreover, natural fiber can also act as a binder where it has been increasingly popular in recent years. Their advantages are biocompatibility, environmentally safe, availability, affordability, and biodegradability.

Binders are polymeric fillers with bonding and adhering characteristics. Durability, rheology, and strength properties of the material after the binder is added are all affected by the mechanism of binding to the substance. When compared to commercial binders, biological binders such as guar gum, gum arabic, xanthan gum, gum karaya, and natural agarose binders provide exceptional performance and several benefits. Recent work has identified *Abelmoschus esculentus* (Okra) gum as particularly well suited to use as a tablet binder, with the Okra gum providing improved hardness, dissolution rate, and deformability. *Abelmoschus esculentus* gum has also been used as a binder in paracetamol tablet formulations, and the *Abelmoschus esculentus* gum provided improved binder concentration and strength.

Prior efforts to use Okra in the manufacturing of polymer composites have been limited to using Okra as a reinforcing agent in a composite relying upon commercially synthesized resins.

Thus, a composite plastering material and method of making the composite plastering material solving the aforementioned problems is desired.

SUMMARY

A composite plastering material includes a mixture of sand-silica and *Abelmoschus esculentus* powder. The composite plastering material has increased compressive strength depending upon the concentration of *Abelmoschus esculentus* powder used. The method of making the composite plastering material includes milling sand-silica, mixing powdered *Abelmoschus esculentus* powder with the sand-silica to produce a first mixture, and mixing water with the first mixture to produce the casting material. The casting material may then be plaster cast by any well-known method in the art, including but not limited to pressing the casting material in a hot press and drying the resulting composite material in an oven.

In an embodiment, the composite plastering material may include between about 5% to about 15% *Abelmoschus esculentus*. For example, the composite plastering material may include about 5%, 6%, 7%, 8%, 9%, 10%, 11%, 12%, 13%, 14%, or 15% *Abelmoschus esculentus*.

In an embodiment, the sand-silica may be milled to different average particle sizes. For example, the sand-silica may be milled to an average particle size between about 25 microns and about 850 microns. In a further embodiment, the sand-silica may be milled to an average particle size of about 25, 50, 75, 100, 150, 200, 250, 300, 350, 400, 450, 500, 550, 600, 650, 700, 750, 800, 850, or 900 microns.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

A composite plastering material includes a mixture of sand-silica and *Abelmoschus esculentus* powder. The composite plastering material has increased compressive strength depending upon the concentration of *Abelmoschus esculentus* powder used.

Figure 4:
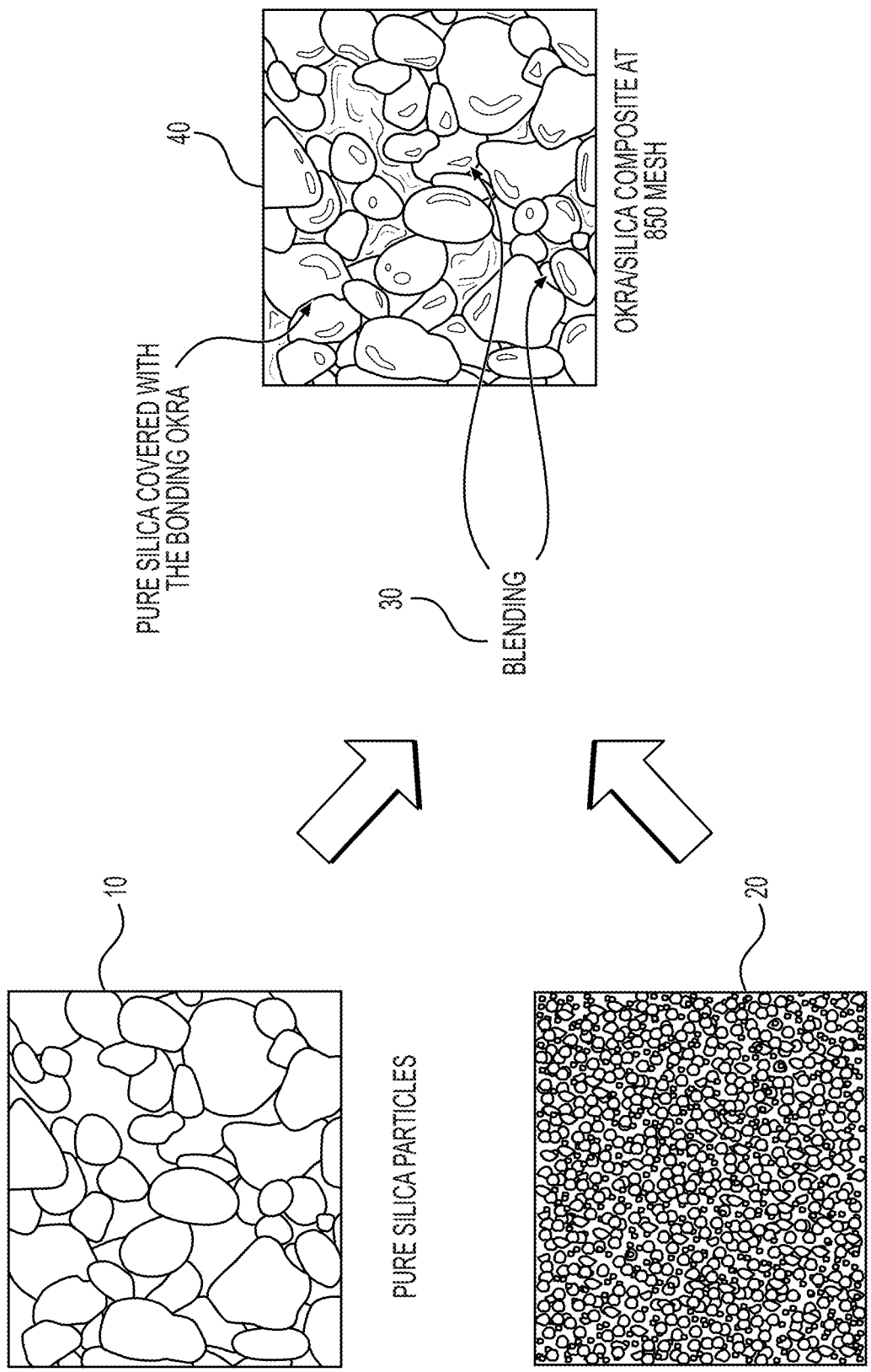
FIG. 4 depicts a flowchart of one embodiment of making the composite plastering material.

As shown in FIG. 4, a method of making the composite plastering material includes sieving sand-silica to produce sand-silica of a uniform particle size 10, providing powdered *Abelmoschus esculentus* grains 20, mixing the powdered *Abelmoschus esculentus* grains and the sand-silica to provide a mixture 30, and adding water to the mixture to produce the composite plastering material 40.

Figure 5:
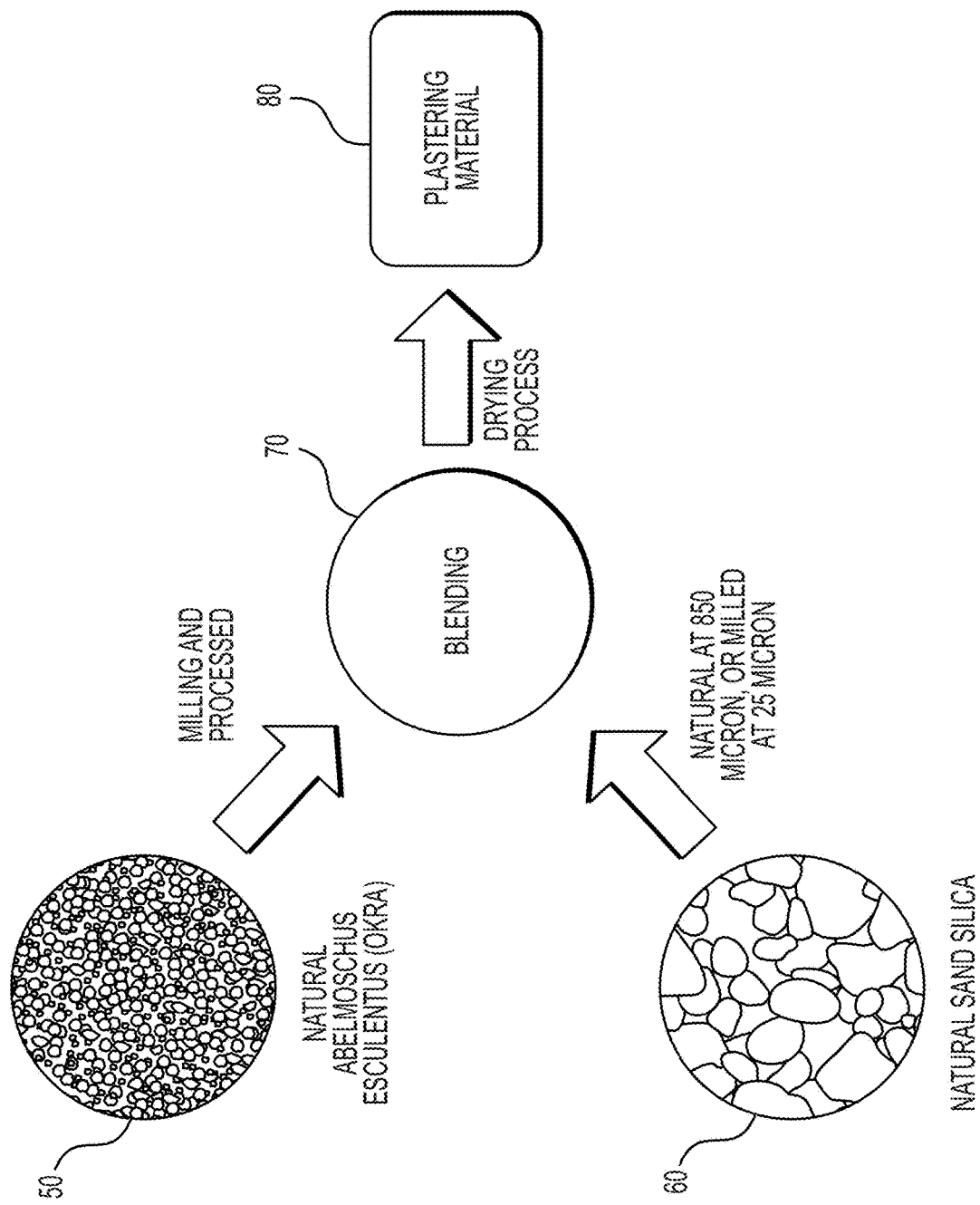
FIG. 5 depicts a flowchart of an alternative embodiment of making the composite plastering material.

Optionally, as shown in FIG. 5, the method may include milling the sand-silica 60 and combining 70 the milled and sieved sand-silica 60 with the *Abelmoschus esculentus* powder 50. The composite may then be plaster cast 80 by any well-known method in the art, including but not limited to pressing the composite in a hot press and drying the resulting composite material in an oven to form the plastering material.

As used herein, "*Abelmoschus esculentus*" refers to the plant species *Abelmoschus esculentus*, also known as Okra, Ladies' Fingers, or Ochro.

In an embodiment, the composite plastering material may include between about 5% to about 15% *Abelmoschus esculentus*. For example, the composite plastering material may include about 5%, 6%, 7%, 8%, 9%, 10%, 11%, 12%, 13%, 14%, or 15% *Abelmoschus esculentus*.

In an embodiment, the sand-silica may be milled to different average particle sizes. For example, the sand-silica may be milled to an average particle size between about 25 microns and about 850 microns. In a further embodiment, the sand-silica may be milled to an average particle size of about 25, 50, 75, 100, 150, 200, 250, 300, 350, 400, 450, 500, 550, 600, 650, 700, 750, 800, or 850 microns.

In an embodiment, the sand-silica may be either natural sand-silica or commercially available ground sand-silica.

In an embodiment, the method of making the composite plaster may include first sorting the sand-silica to remove any stones and non-sand particles. The sand-silica may be washed and dried prior to the optional milling step.

In an embodiment, the milling may use a commercial milling machine. Milling may be performed for different periods of time, depending upon the desired average size of the sand-silica particles.

In an embodiment, the *Abelmoschus esculentus* used in the production of the composite plaster may be commercially sourced, powdered *Abelmoschus esculentus*. The *Abelmoschus esculentus* powder may be produced from any part of the *Abelmoschus esculentus* plant, including but not limited to plant waste by-products produced during the farming of Okra.

In an embodiment, the composite plastering material may include an insecticide, a rodenticide, and/or a chemical attractant for insects or rats, or a combination thereof. The insecticide, rodenticide, and chemical attractants may be any suitable substance known in the art.

In an embodiment, the composite plastering material may include plant seeds for use in farming or gardening. The plant seeds could be any seeds capable of germinating a desirable plant species. In use, the composite plastering material comprising the plant seeds would be wetted or soaked for a period of time, causing the composite plastering material comprising the plant seeds to degrade until the seeds were exposed. Once exposed, the seeds could germinate and grow. The thickness of the layer of the composite plastering material covering the seeds could be varied to provide control over the period of time required for the seeds to be exposed.

The composite plastering material and method of making same may be better understood in view of the following examples, which are illustrative only and are not intended to limit the present teachings.

Example 1

Production of the Composite Plastering Material

Natural sand-silica was collected and sorted to remove stones and non-sand particles. The natural sand-silica was washed with water and dried. The natural sand-silica was separated into two samples. The first sample was sieved to produce 850 micron average diameter powder. The second sample was milled using a commercial milling machine and sieved to produce 25 micron average diameter powder. Each sample was then mixed with sufficient *Abelmoschus esculentus* powder for a final dry weight percentage of 5%, 10%, or 15% *Abelmoschus esculentus* (with the remainder being sand-silica). The resulting mixture was then gradually sprayed with pure water until it became a homogenous mixture with a clay-like structure. The mixture was then further mixed by hand for 5 minutes, placed in a steel cylindrical mold, and subjected to a 500 kg load for 30 minutes at 70° C. using a hot press. The composite material was then dried in an oven for 15 minutes at a temperature of 95° C., removed, and left at room temperature for at least 2 hours.

Example 2

Testing the Composite Plastering Material

Figure 1:
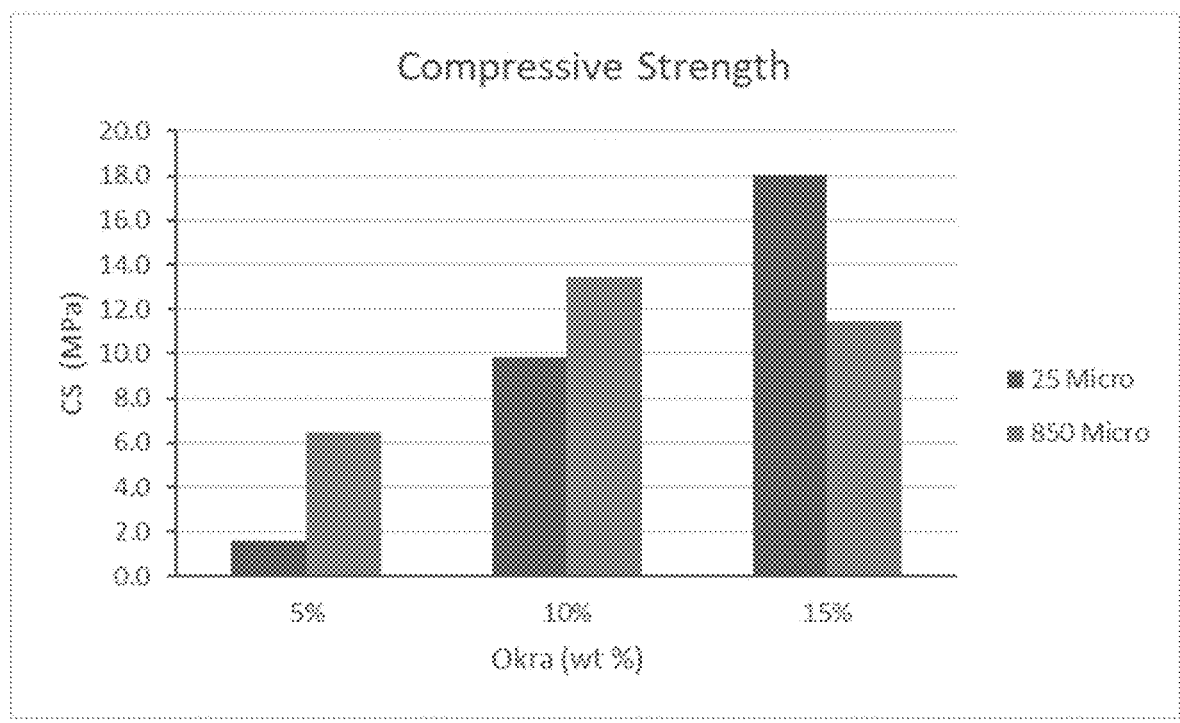
FIG. 1 depicts a graph illustrating the compressive strength of a number of sand-silica and *Abelmoschus esculentus* composites using a range of concentrations of *Abelmoschus esculentus* and average particle sizes of sand-silica.

The compressive strength of the various composite materials synthesized according to Example 1 was tested, demonstrating an increase in compressive strength with increased concentration of *Abelmoschus esculentus* powder up to 15% for the samples using 25 micron milled sand-silica and up to 10% for the samples using 850 micron natural sand-silica. (See FIG. 1 and Tables 1-2) Notably, for all samples tested containing 10% or 15% *Abelmoschus esculentus* powder the compressive strength exceeded 7 MPa, and thus fell within the range of common plastering materials used for construction materials.

Figure 2:
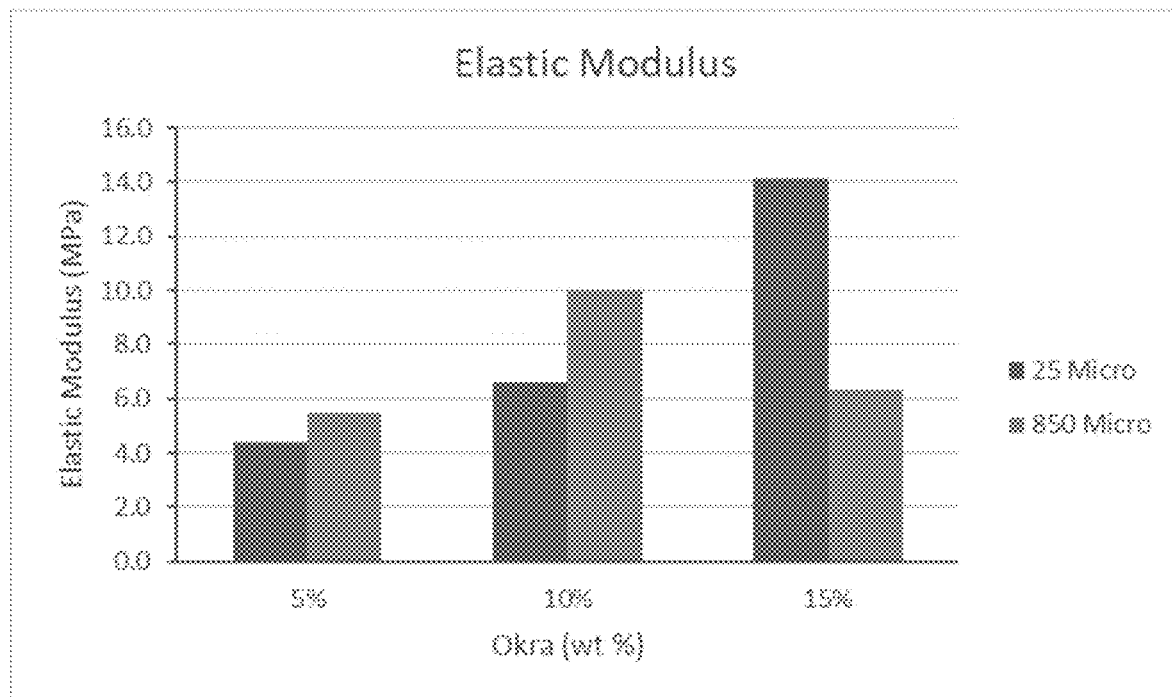
FIG. 2 depicts a graph illustrating the elastic modulus of a number of sand-silica and *Abelmoschus esculentus* composites using a range of concentrations of *Abelmoschus esculentus* and average particle sizes of sand-silica.

The elastic modulus of the various composite materials synthesized according to Example 1 was tested, demonstrating a linear increase in the elastic modulus up to 15% *Abelmoschus esculentus* powder for the samples using 25 micron milled sand-silica and up to 10% for the samples using 850 micron natural sand-silica. (See FIG. 2 and Tables 1-2)

Figure 3:
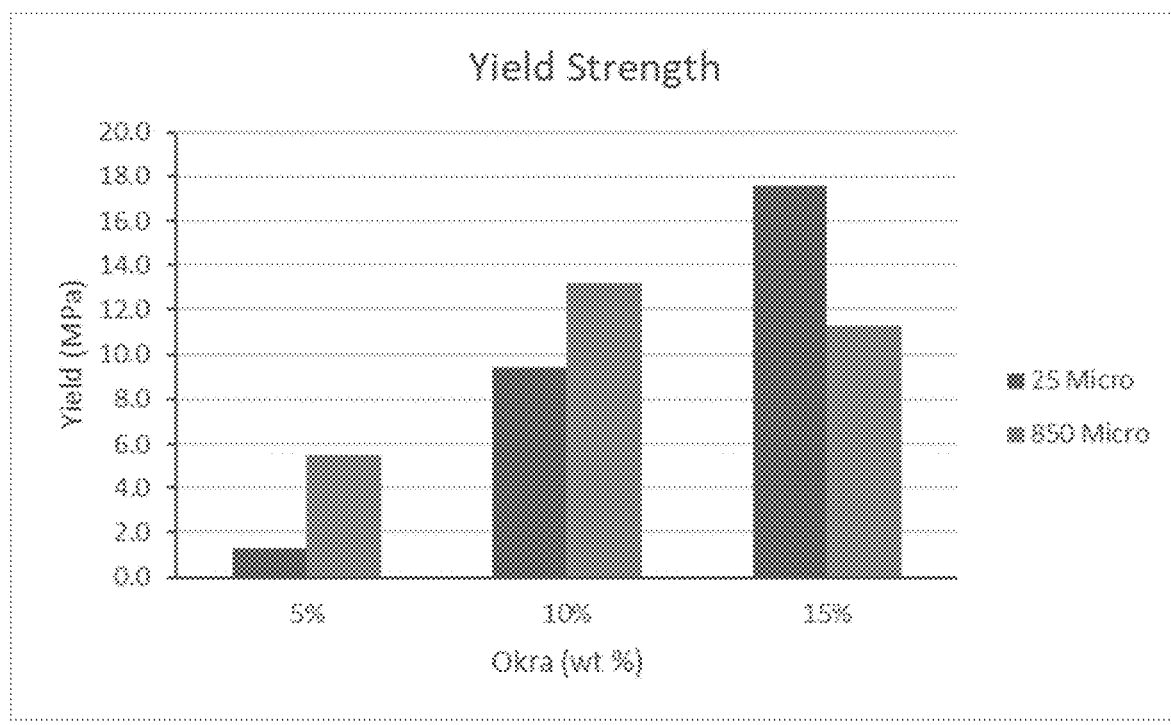
FIG. 3 depicts a graph illustrating the yield strength of a number of sand-silica and *Abelmoschus esculentus* composites using a range of concentrations of *Abelmoschus esculentus* and average particle sizes of sand-silica.

The yield strength of the various composite materials synthesized according to Example 1 was tested, demonstrating an increase in yield strength characteristics with increased concentration of *Abelmoschus esculentus* powder up to 15% for the samples using 25 micron milled sand-silica and up to 10% for the samples using 850 micron natural sand-silica. (See FIG. 3 and Tables 1-2)

TABLE 1

Mechanical Properties of Composite
Material With 25 Micron Sand-Silica

| Abelmoschus esculentus % | Compressive Strength (MPa) | Yield Strength (MPa) | Elastic Modulus (MPa) | Ductility (%) |
|---|---|---|---|---|
| 5 | 1.6 | 1.3 | 4.4 | 18.5 |
| 10 | 9.8 | 9.4 | 6.6 | 17.5 |
| 15 | 18.0 | 17.6 | 14.1 | 12.2 |

TABLE 2

Mechanical Properties of Composite Material
With 850 Micron Sand-Silica

| Abelmoschus esculentus % | Compressive Strength (MPa) | Yield Strength (MPa) | Elastic Modulus (MPa) | Ductility (%) |
|---|---|---|---|---|
| 5 | 6.4 | 5.5 | 5.5 | 18.7 |
| 10 | 13.4 | 13.2 | 10.0 | 33.5 |
| 15 | 11.5 | 11.3 | 6.3 | 63.5 |

It is to be understood that the composite plastering material and method of making same is not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A composite plastering material comprising:
   between about 5% and about 15% final dry weight percentage powdered *Abelmoschus esculentus*; and
   sand-silica;
   wherein the final dry weight percentage is the percentage of the final dry weight of the bio-composite plastering material.

2. The composite plastering material as recited in claim 1, wherein the composite plastering material comprises about 5% final dry weight percentage powdered *Abelmoschus esculentus*.

3. The composite plastering material as recited in claim 1, wherein the composite plastering material comprises about 10% final dry weight percentage powdered *Abelmoschus esculentus*.

4. The composite plastering material as recited in claim 1, wherein the composite plastering material comprises about 15% final dry weight percentage powdered *Abelmoschus esculentus*.

5. The composite plastering material as recited in claim 1, wherein the sand-silica has an average diameter of between about 25 microns and about 850 microns.

6. The composite plastering material as recited in claim 5, wherein the sand-silica has an average diameter of about 25 microns.

7. The composite plastering material as recited in claim 5, wherein the sand-silica has an average diameter of about 850 microns.

8. A method of making the composite plastering material of claim 1 comprising the steps of:
   sieving sand-silica to produce sand-silica with particles of a uniform size;
   mixing the sieved sand-silica with *Abelmoschus esculentus* powder to produce a first mixture;
   mixing water with the first mixture to produce the composite plastering material.

9. The method of claim 8, further comprising milling the sand-silica prior to the sieving step.

10. The method of claim 9, further comprising sieving the milled sand-silica to produce a sand-silica having an average diameter of 25 microns.

11. The method of claim 8, further comprising plaster casting the composite plastering material.

12. The method of claim 11, wherein the plaster casting comprises pressing the composite plastering material in a hot press and drying the composite plastering material in an oven.

13. The method of claim 8, further comprising mixing the sieved sand-silica with about 5% final dry weight percentage *Abelmoschus esculentus* powder.

14. The method of claim 8, further comprising mixing the sieved sand-silica with about 10% final dry weight percentage *Abelmoschus esculentus* powder.

15. The method of claim 8, further comprising mixing the sieved sand-silica with about 15% final dry weight percentage *Abelmoschus esculentus* powder.

16. The method of claim 8, further comprising sieving the sand-silica to produce a sand-silica having an average diameter of 850 microns.

17. The method of claim 8, wherein the mixing water with the first mixture further comprises gradually spraying water on the first mixture until it becomes a homogenous mixture.

* * * * *